(12) United States Patent
Dietrich et al.

(10) Patent No.: US 9,631,699 B2
(45) Date of Patent: Apr. 25, 2017

(54) DRIVE SYSTEM WITH A DRIVE CHAIN GUIDED OVER A SPROCKET

(71) Applicant: SIMERTIS GMBH, Aachen (DE)

(72) Inventors: Michael Dietrich, Dortmund (DE); Holger Haut, Aachen (DE)

(73) Assignee: SIMERTIS GMBH, Aachen (DE)

( * ) Notice: Subject to any disclaimer, the term of this patent is extended or adjusted under 35 U.S.C. 154(b) by 56 days.

(21) Appl. No.: 14/413,220

(22) PCT Filed: Jul. 5, 2013

(86) PCT No.: PCT/EP2013/064244
§ 371 (c)(1),
(2) Date: Jan. 6, 2015

(87) PCT Pub. No.: WO2014/006179
PCT Pub. Date: Jan. 9, 2014

(65) Prior Publication Data
US 2015/0159732 A1     Jun. 11, 2015

(30) Foreign Application Priority Data
Jul. 6, 2012   (DE) ........................ 10 2012 106 068

(51) Int. Cl.
*F16G 13/04*   (2006.01)
(52) U.S. Cl.
CPC .................................. *F16G 13/04* (2013.01)
(58) Field of Classification Search
CPC ....................................................... F16G 13/04
See application file for complete search history.

(56) References Cited

U.S. PATENT DOCUMENTS

| 1,140,319 A | 5/1915 | Van Houten |
| 1,658,602 A | 2/1928 | Koelkebeck |
| (Continued) | | |

FOREIGN PATENT DOCUMENTS

| DE | 101600 | 8/1897 |
| DE | 4233552 A1 | 3/1994 |
| (Continued) | | |

OTHER PUBLICATIONS

International Search Report, Dated Oct. 9, 2013.

*Primary Examiner* — William E Dondero
*Assistant Examiner* — Robert T Reese
(74) *Attorney, Agent, or Firm* — Johnson, Marcou & Isaacs, LLC; Jennifer S. Stachniak

(57) ABSTRACT

A drive system with a drive chain which is guided over a sprocket (10), said sprocket having a sequence of teeth (11) arranged on its circumference, and which is composed of a succession of chain links (14), wherein each chain link (14) is composed of at least two link plates (15) which are arranged parallel to one another and which are connected to one another by means of link pins (16), is characterized in that the individual chain links (14) are coupled to one another by means of at least one connecting plate (18) which is arranged between said chain links and which permits a parallel displacement of the chain links (14) relative to one another, wherein each connecting plate (18) has at least one projection (19), and projections (19) and teeth (11) have in each case an angular form with rectilinearly running tooth flanks (13) and engagement flanks (20), and in that, in the case of a load-induced elongation of the connecting plates (18), the engagement flanks (20), starting with the final connecting plate (18) which is in engagement as far as the first connecting plate (18) which is passing into engagement, slide outward on the tooth flanks (13) of the individual (Continued)

successive teeth (11) such that the areal contact is maintained.

5 Claims, 4 Drawing Sheets

(56) References Cited

U.S. PATENT DOCUMENTS

| | | | | |
|---|---|---|---|---|
| 5,690,571 | A | 11/1997 | Mott | |
| 2002/0142874 | A1* | 10/2002 | Markley | F16H 55/30 474/202 |
| 2008/0300079 | A1* | 12/2008 | Botez | F16G 13/04 474/213 |
| 2009/0062051 | A1* | 3/2009 | Ogo | F16G 13/04 474/213 |
| 2012/0196712 | A1* | 8/2012 | Miyanaga | F16G 13/04 474/213 |
| 2013/0203539 | A1* | 8/2013 | Kirchner | C22C 38/002 474/228 |
| 2014/0200106 | A1* | 7/2014 | Young | F16G 13/04 474/148 |
| 2015/0240914 | A1* | 8/2015 | Kurono | F16G 13/04 474/230 |

FOREIGN PATENT DOCUMENTS

| | | |
|---|---|---|
| DE | 19629602 A1 | 1/1998 |
| EP | 1245870 A2 | 10/2002 |
| JP | 56120459 | 9/1891 |

\* cited by examiner ically, in the above-
noted intermediate spaces and carry with it the drive chain.

DRIVE SYSTEM WITH A DRIVE CHAIN GUIDED OVER A SPROCKET

The instant application should be granted the priority dates of Jul. 6, 2012, the filing date of the corresponding German patent application 10 201 2 106068.1, as well as Jul. 5, 2013, the filing date of the international patent application PCT/EP2013/064244.

BACKGROUND OF THE INVENTION

The invention relates to a drive system with a drive chain guided over a sprocket, the sprocket having a sequence of teeth arranged on its circumference and which is composed of a succession of chain links, wherein each chain link is composed of at least two link plates that are arranged parallel to one another and connected to one another by means of link pins that engage through associate openings and the teeth of the sprocket engage in the intermediate spaces existing between the link plates and defined by the link pins.

A drive chain formed for such a drive system in cooperation with a sprocket as a plate link chain is known from DE 42 33 552 A1. In this connection, the individual chain links connected directly to one another via the link pins, respectively, comprise two outer plates or two correspondingly arranged inner plates arranged parallel to one another. In the chain links, respectively, intermediate spaces are formed that are defined by the link plates on the one hand and the link pins on the other hand, such that the teeth formed on the sprocket engage during circulation of the drive chain over the sprocket, respectively, in the above-noted intermediate spaces and carry with it the drive chain.

With these types of drive systems, however, the problem occurs that with increasing operation, a wear-related lengthening of the drive chain with an increase of its spacing occurs. With this type of drive system, eventually restraint of the individual teeth of the sprockets in the intermediate spaces of the chain links can occur, so that in this manner, the wear on the chain links as well as on the teeth of the sprocket is increased.

SUMMARY OF THE INVENTION

The invention is therefore based on the objection of providing a drive system with the above-noted features, in which the state of the chain restraint during circulation of the drive chain over the sprocket is avoided and therewith, the occurrence of wear on the sprocket and chain links is reduced.

The invention contemplates in its essential concept that the individual chain links are coupled to one another by means of at least one connecting plate arranged between the chain links which permit a parallel displacement of the chain links, whereby each connecting plate has a projection on its side that comes into contact with the sprocket, the projection engaging in the tooth intermediate space between the teeth of the sprocket and each connecting plate is engaged through at both ends by a respective link pin associated with a chain link connected to the connecting plate and that the teeth of the sprocket as well as the projections formed on the connecting plates, respectively, have an angular shape with linearly running tooth flanks and engagement flanks, disposed such that during circulation of the drive chain over the sprocket, the leading tooth flanks of all teeth of the sprocket that are engaged with the drive chain, in all wear states of the drive chain, have an areal contact on the engagement flanks of the connecting plates, such that a running surface-type of support of the drive chain on the sprocket exclusively on the tooth flanks and engagement flanks of the connecting plates and teeth that are engaged during circulation is provided. In the event of a load-related lengthening of the connecting plates and therewith, an accompanying increase of the spacing of the drive chain based on the parallel displacement permitted by each connecting plate of two adjacent chain links, the engagement flanks of the connecting plates engaged with the sprocket, starting with the final connecting plate in engagement as far as the first connecting plate which is passing into engagement, slide outward on the tooth flanks of the individual successive teeth such that the areal contact is maintained between the chain links and the teeth of the sprocket on a spiral track about the central point of the sprocket.

The present invention is connected with the advantage that with a drive chain according to the present invention composed of the link plates and the connecting plates, an additional variance is provided. Since based on the interposition of the connecting plates between the chain links formed by the link plates, in addition to the further rotatability of the chain links relative to one another, now also a parallel displacement of the chain links relative to one another is possible, so that during circulation of the drive chain formed according to the present invention over an associated sprocket, the individual chain links can engage, respectively, one position on the circumference of the sprocket independently of the position of the respective leading and ending chain link. In this connection, the teeth of the sprockets and the projections formed on the connecting plates, respectively, are provided an angular form with linearly running flanks, so that the projections formed on the connecting plates can glide with their engagement flanks with a change of their position to the circumference of the sprocket onto the tooth flanks of the teeth of the sprocket, without giving up areal contact of the flanks resting on one another. Thus, this offers the advantage of a respectively minimal bearing pressure. Based on this embodiment, it is further permitted that also with an increased spacing of the drive chain caused by wear, the areal contact of all projections of the connecting plates that are in engagement with the sprocket are maintained, without causing changes on the sprocket or the chain links or the connecting plates. In this regard, in all states of wear of the drive chain of the present invention, with a distribution of the drive force to be transferred onto a plurality of chain links and connecting plates that are in engagement with the sprocket in the form of the projections formed on the connecting plates.

According to an exemplary embodiment of the invention, with regard to the positioning of the drive chain in a new condition, it can be provided that in the new condition of the drive chain, the projections of the connecting plates of the chain links engaging between two teeth of the sprocket, on the one hand, lie on the leading tooth flank and their opposite side are supported at least linearly on the opposite, rear side tooth surface of the tooth of the sprocket that is adjacent in the direction of rotation. The invention also includes the idea that in the new condition of the chain, the projections formed on the connecting plates contact the entire surface with both engagement flanks on the tooth flanks of the sprocket.

According to an exemplary embodiment of the invention, it can be provided that the connecting plates of the drive chain on their side facing the sprocket during circulation about the sprocket are provided with a projection extending over the outer contour of the link plates. In the frame of such a drive system, guiding of the drive chain on the sprocket, respectively, is possible on only one side.

Alternatively, it can be provided that the connecting plates of the drive chain in a symmetrical formation, respectively, on both longitudinal sides are provided with a projection extending over the outer contour of the link plates. This therefore provides the advantageous possibility that the drive chain also can be reversed and guided via sprockets arranged with an offset direction of rotation.

The application of the present invention further is not limited to the formation of the chain links of the drive chain with two link plates arranged parallel to one another, rather also embodiments are included in which the drive chain comprises a plurality of link plates arranged parallel to one another, with respective connecting plates disposed there between and the sprocket is provided on its circumference with a corresponding number of rows of teeth arranged parallel to one another.

In order to improve the orientation of the individual chain links upon engagement of the projections formed on the connecting plates in the sprocket, according to another embodiment of the invention, it is provided that the angle of the engagement flanks of the projections formed on the connecting plates with the longitudinal axis is between 10° and 75° and in particular, is determined by the frictional ratio that is predetermined by the material as well as the preload and drive forces acting on the drive chain. In so far as such a flat angle generally facilitates a displacement of the connecting plates relative to the teeth upon engagement with the sprocket, it is understood that the determination of the angle is determined by the frictional ratio, which is predetermined by the material as well as the preload and drive forces acting on the drive chain.

The embodiment of the drive chain according to the present invention in addition makes possible a chain structure, in which only the worn parts must be changed; in practice, well accessible connecting plates are provided.

BRIEF DESCRIPTION OF THE DRAWINGS

In the drawings, exemplary embodiments of the invention are provided, which will be described subsequently. In the drawings.

DETAILED DESCRIPTION OF SPECIFIC EMBODIMENTS

Figure 2:
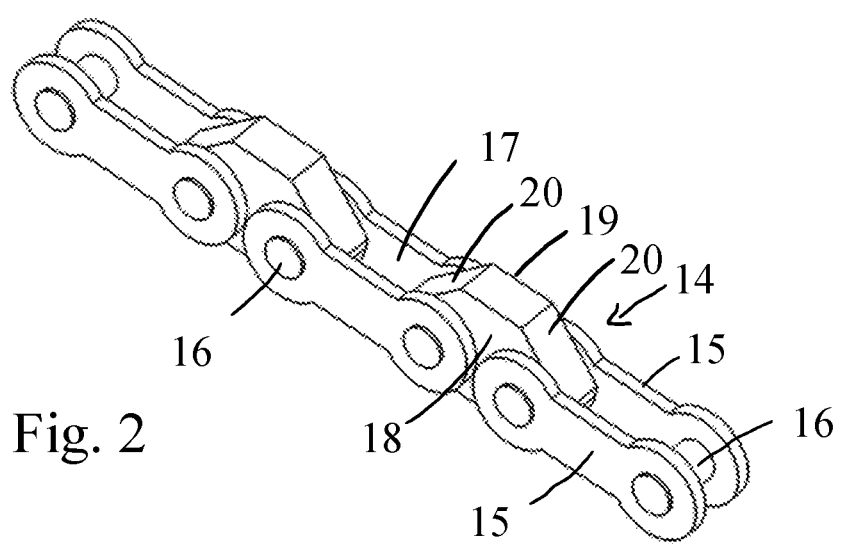
FIG. 2 shows a series of chain links made up of two link plates arranged parallel to one another and coupled to one another by interconnecting connecting plates for forming a drive chain.

The sprocket 10 shown in FIG. 2 has teeth 11 distributed on its outer circumference with tooth intermediate spaces 12 formed therebetween. The teeth 11 have an angled shape with linearly running tooth flanks 13, whereby the outer tooth tips are flat.

As shown in FIG. 2, the individual chain links 14 comprise a drive chain made of, respectively, two link plates 15 arranged parallel to one another, which are connected to one another at their ends by means of a respective chain bolt 16 engaging through an associated opening. In contrast to the state of the art, in the series of chain links 14, no inner plates and outer plates are provided; in addition, the respective link plates 15 lie in a plane, because the individual chain links 14 are connected to one another not directly, rather via connecting plates 18 interconnected therebetween, which are engaged through at both of their ends by one of the chain bolts 16 associated with the chain links 14 connected to the respective connecting plate 18. In this regard, the individual chain links 14 have intermediate spaces 17 defined by the two link plates 15 as well as the ends of the connecting plates 18 located on the end side for engagement of the teeth 11 of the sprocket 10 during circulation of the drive chain.

As shown further in FIG. 2, on the connecting plate 18, respectively, a projection 19 that extends outwardly over its contour is provided, the projection 19 having engagement flanks 20 on both sides oriented in the running direction of the drive chain or the chain links 14; the tip of the projection 19 of the associated connecting plate 18 likewise is flat.

Figure 1:
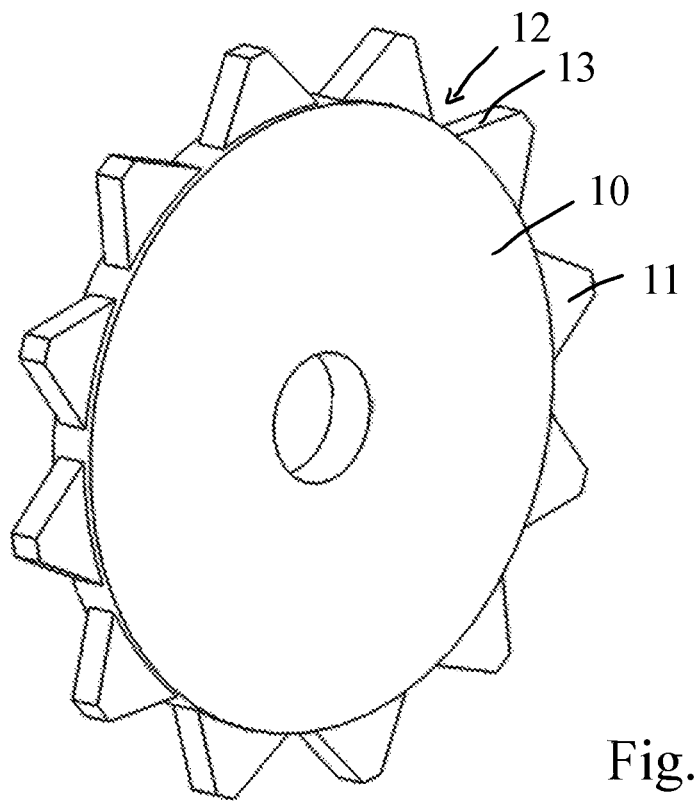
FIG. 1 shows one of a sequence of sprockets with teeth mounted on its outer circumference for a drive system with a drive chain driven by the sprocket.
Figure 3:
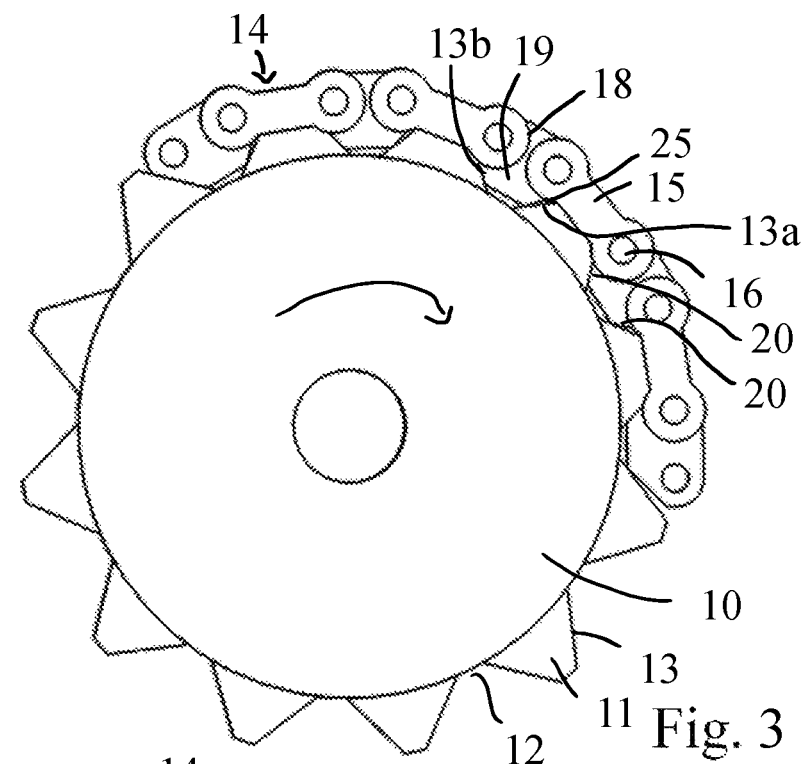
FIG. 3 shows the drive chain corresponding to the spacing of the sprocket in an embodiment according to FIG. 2 during circulation over a sprocket according to FIG. 1.

If a drive chain with chain links 14 embodied as in FIG. 2 and coupled to one another via the connecting plates 18 is circulated over a sprocket 10 with teeth 11, as represented in FIG. 1, it is clear from FIG. 3 that upon rotation of the sprocket 10 in a clockwise direction, the engagement flanks 20 of all projections 19 of the connecting plates 18 engaged with the teeth 11, respectively, are in areal contact with the leading tooth flank 13b, while on the opposite side of the respective projection 19 of the association connecting plate 18, a first linear support of the association engagement flank 20 is provided on the rearward tooth flank 13a of the adjacent tooth 11 in the direction of rotation with formation of an angular open column 25 that opens radially outward. This state arises generally only during a time frame in which still no recognizable wear has occurred, such that the spacing of the drive chain with the chain links coupled to one another by means of the connecting plates 28 corresponds with the spacing of the teeth 11 of the sprocket 10. With this type of a simple linear support, the requirements of a dimensionally accurate manufacture are reduced, because during manufacturing of the drive chain in its new condition, an accurately-fitting engagement of the projection 19 of the connecting plate 18 into the tooth intermediate space 12 of the sprocket 10 must not be provided. However, the invention also does not exclude such an accurately-fitting engagement.

FIG. 3 shows further that on the one hand, the teeth 11 of the sprocket 10 engage in the intermediate spaces 17 of the chain links 17 and on the other hand, the projections 19 of the associated connecting plates 18 engage in the intermediate spaces 12 between the teeth 11 of the sprocket 10, and that further, the projections 19, on the front area engaging in the tooth intermediate spaces 12, are flattened, such that no front-side support of the projections 19 on the sprocket 10 is provided.

Figure 4:
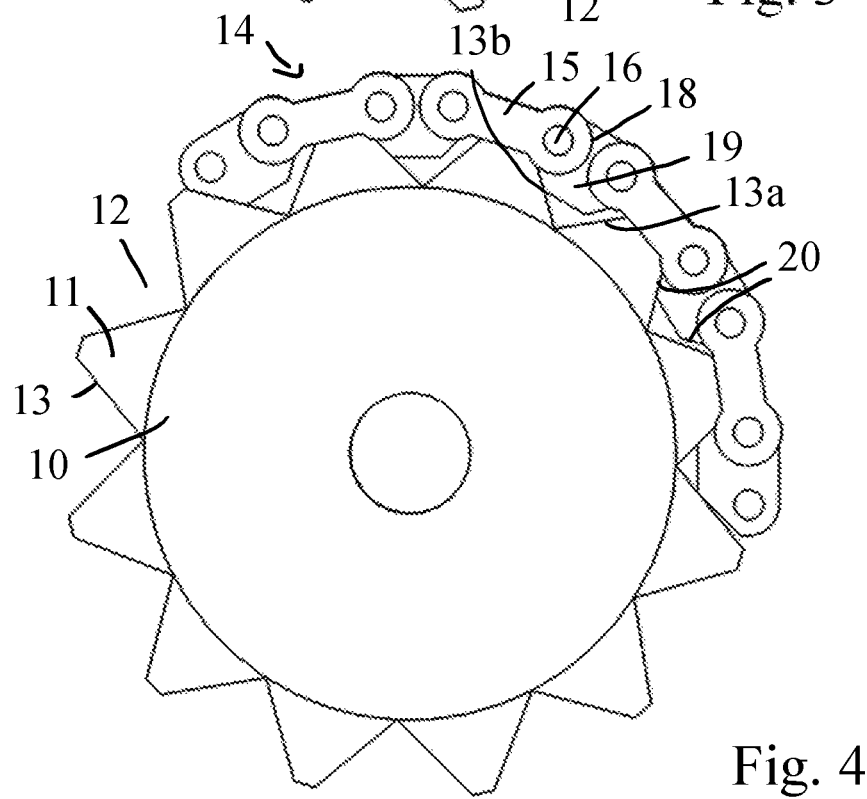
FIG. 4 shows the circulation of the drive chain according to FIG. 3 with a drive chain showing wear.

If wear of the drive chain occurs, in particular, a lengthening of the drive chain and thereby an enlargement of its spacing, a state is provided as shown in FIG. 4. Based on the parallel displacement permitted by the connecting plates 18 of two adjacent chain links 14 against one another, projections 19 of the connecting plates 18 lying in the recesses 12 of the sprocket 10 slide from the last connecting plate 18 still engaged with the sprocket 10 into the subsequently arrangement tooth intermediate space 12 counter to the rotation direction until entry of the projection 19 of the first connecting plate 18 into the sprocket 10, respectively, further radially outwardly. The associated engagement flanks 20 lift up from the leading tooth flanks 13a, however, retained in engagement with the tooth flanks 13b of the teeth 11 that drive the chain links 15 in the direction of rotation of the sprocket 10, without, however, a restraint of the engagement of the projection 19 formed on the associated connecting plate 18 in the respective tooth intermediate space 12. Since this is true for all projections of the connecting plates 18 or associated chain links 14 in circulation, the bearing pressure in the area of each individual projection 19 and each individual tooth 11 is reduced, so that the force transmission is improved.

Figure 5:
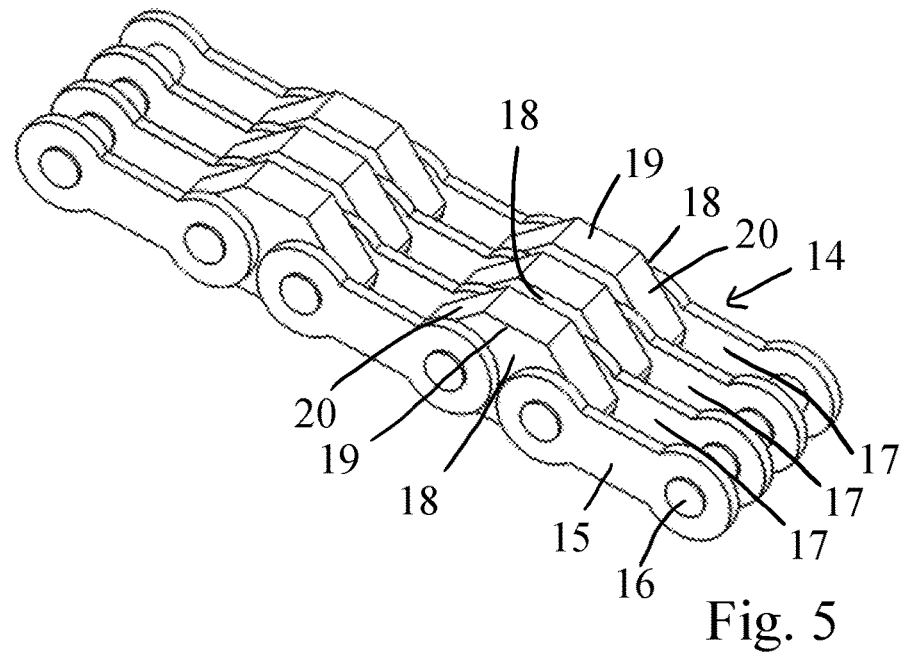
FIG. 5 shows the drive chain according to FIG. 3 in an altered embodiment with more than two links plates arranged parallel to one another.
Figure 6:
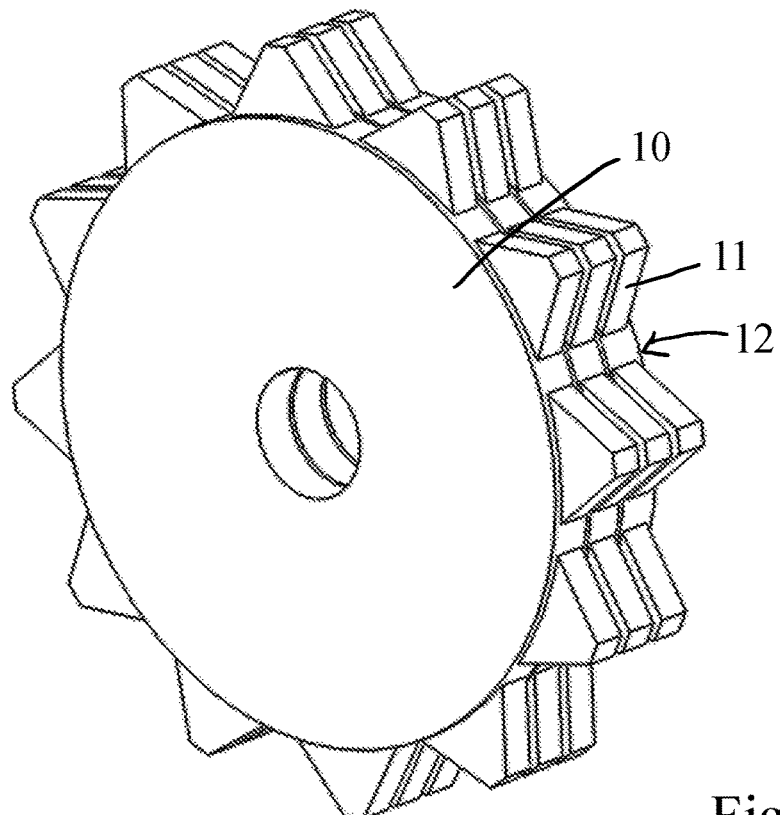
FIG. 6 shows a sprocket with three collars of teeth arranged spaced to one another in a perspective representation according to FIG. 1.

In FIGS. 5 and 6, an exemplary embodiment of the invention is shown, in which the sprocket 10 has three collars of teeth arranged superimposed and spaced from one another. Accordingly, also the drive chain shown in FIG. 6 is formed with four link plates 15 arranged adjacent one another and three intermediate spaces 17 and associated connecting plates 18 therebetween.

Figure 7:
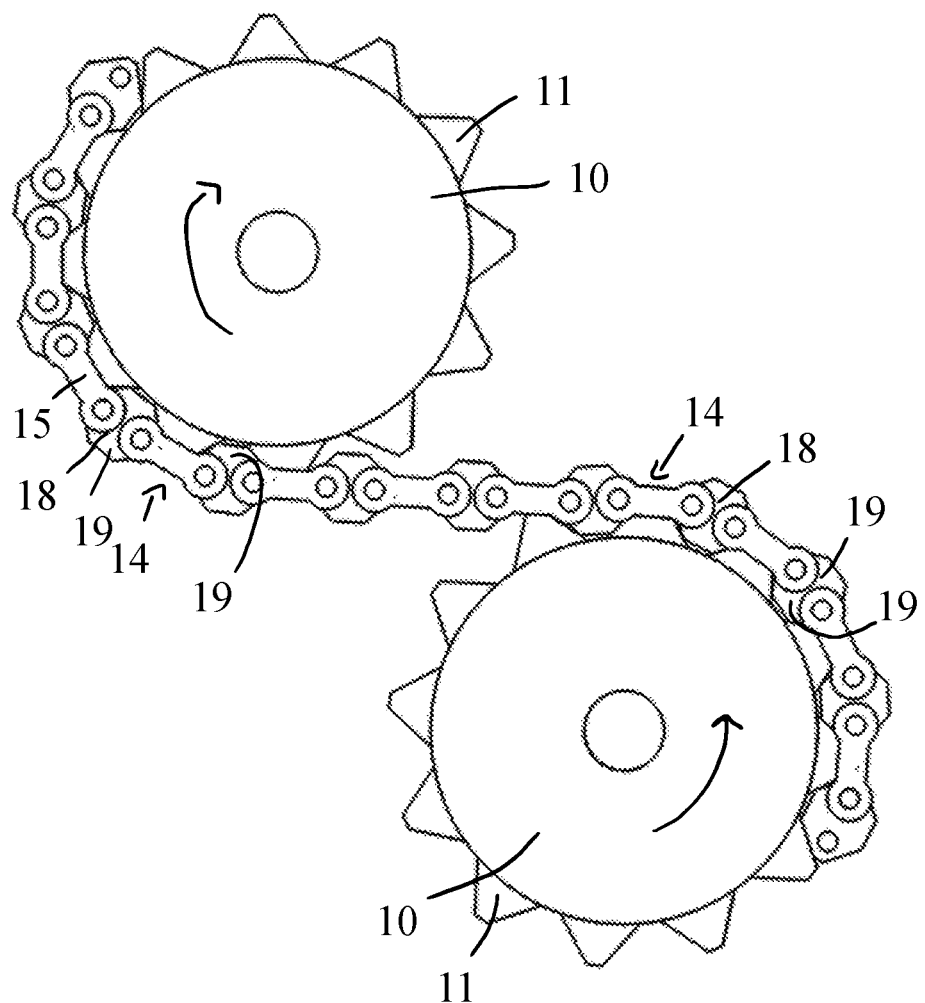
FIG. 7 shows an arrangement of two sprockets displaced relative to one another with a drive chain guided above it in a reverse direction.

With the exemplary embodiment shown in FIG. 7, as a modification to the drive chains shown in FIGS. 2 and 6, on the connecting plates 18, in a symmetrical formation, respectively, a projection 19 extending to both sides of the connecting plates 18 over the contour of the link plates 15 is formed, whereby it is possible to guide the drive chain also with a reversed direction over two sprockets 10 displaced to one another, which run or are driven, respectively, with a different direction of rotation.

The features of the subject matter of this disclosure that are described in the foregoing description, the patent claims, the abstract and the drawings can be important individually as well as in any combination for realization of the invention in its various embodiments.

The specification incorporates by reference the disclosure of German patent application DE 10 2012 106 068.1, filed Jul. 6, 2012, as well as international application PCT/EP2013/064244, filed Jul. 5, 2013.

The present invention is, of course, in no way restricted to the specific disclosure of the specification and drawings, but also encompasses any modifications within the scope of the appended claims.

The invention claimed is:
1. A drive system, comprising:
a drive chain;
a sprocket (10), wherein said drive chain is guided over said sprocket (10), said sprocket having a sequence of teeth (11) arranged on its circumference,
wherein said drive chain is composed of a succession of chain links (14), wherein each chain link (14) is composed of at least two link plates (15) which are arranged parallel to one another and which are connected to one another by means of link pins (16),
wherein teeth (11) of the sprocket (10) engage in intermediate spaces (17) between the link plates (15) and defined by the link pins (16),
wherein said individual chain links (14) are coupled to one another by means of at least one connecting plate (18) arranged between said chain links, wherein said at least one connecting plate (18) permits a parallel displacement of said chain links (14) relative to one another,
wherein each connecting plate (18), on a side that comes into contact with the sprocket (10), has a projection (19) engaging in the tooth intermediate spaces (12) between the teeth (11) of the sprocket (10), and each connecting plate (18), at both of its ends, is engaged through, respectively, by one of the link bolts (16) associated with the chain links (14) connected to the connecting plate (18),
wherein the teeth (11) of the sprocket (10) and the projection (19) formed on the at least one connecting plate (18) each have an angular form with rectilinearly running tooth flanks (13) and engagement flanks (20), such that upon circulation of the drive chain over the sprocket (10), a leading tooth flank (13a) of all teeth (11) of the sprocket (10) in engagement with the drive chain, in all states of wear of the drive chain, are disposed in an area contact on the engagement flanks (20) of the at least one connecting plate (18), so that a running surface support of the drive chain is provided on the sprocket (10) exclusively on the tooth flanks (13) and the engagement flanks (20) of teeth (11) and at least one connecting plate (18) that are engaged during circulation, wherein, when the drive chain is in a new condition, the projection (19) of the at least one connecting plate (18) that engage between two teeth (11) of the sprockets (10) contact the chain links (14) on a leading tooth flank (13b) and on an opposite side of said projection (19), the projection (19) is supported at least linearly on an opposite rearside tooth flank of an adjacent tooth (11) of the sprocket (10) in a direction of rotation, and
wherein during a load-induced elongation of the at least one connecting plate (18), and associated enlargement of the spacing of the drive chain, based on the parallel displacement of two adjacent chain links (14) that is permitted by each connection plate (18), the engagement flanks (20) of the at least one connecting plate (18) engaged with the sprocket (10), starting with the final connecting plate (18) which is in engagement as far as the first connecting plate (18) which is passing into engagement, slide outward on the tooth flanks (13) of the individual successive teeth (11) such that the area of contact is maintained, so that the center points of the respectively cooperating contact surfaces between the chain links (14) and the teeth (11) of the sprocket lie on a spiral-shaped path about a central point of the sprocket (10).

2. The drive system according to claim 1, wherein the at least one connecting plate (18) of the drive chain is provided on a side facing toward the sprocket (10) while circulating over the sprocket (10) with a projection (19) that projects over an outer contour of the link plates (15).

3. The drive system according to claim 1, wherein the at least one connecting plate (18) of the drive chain is provided, respectively, with projections that extend over the outer contour of the link plates (15) in a symmetrical formation, respectively, on both longitudinal sides.

4. The drive system according to claim 1, wherein the drive chain comprises a plurality of link plates (15) arranged parallel to one another with connecting plates (18) lying therebetween, respectively, and the sprocket (10) is provided on its circumference with a corresponding number of rows of teeth arranged parallel to one another.

5. The drive system according to claim 1, wherein the angle of the engagement flank (20) of the projection (19) formed on at least one connecting plate (18) with its respective longitudinal axes is between 10° and 75°, wherein the angle is determined by a frictional ratio predetermined by a material used and the preload and drive forces acting on the drive chain.

* * * * *